US011038234B2

(12) United States Patent
Sugiyama et al.

(10) Patent No.: US 11,038,234 B2
(45) Date of Patent: Jun. 15, 2021

(54) BATTERY PACK, ELECTRONIC DEVICE, ELECTRICALLY DRIVEN VEHICLE, ELECTRIC TOOL, AND POWER STORAGE SYSTEM (71) Applicant: MURATA MANUFACTURING CO., LTD., Kyoto (JP)

(72) Inventors: Masaaki Sugiyama, Kyoto (JP); Tsuyoshi Nakamura, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 150 days.

(21) Appl. No.: 16/296,916

(22) Filed: Mar. 8, 2019

(65) Prior Publication Data

US 2019/0207179 A1 Jul. 4, 2019

Related U.S. Application Data (63) Continuation of application No. PCT/JP2017/025208, filed on Jul. 11, 2017.

(30) Foreign Application Priority Data

Oct. 3, 2016 (JP) .............................. JP2016-195524

(51) Int. Cl.
*H01M 2/10* (2006.01)
*H01M 50/20* (2021.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC .... H01M 2/1077; H01M 2/10; H01M 10/613; H01M 10/6551; H01M 50/20
See application file for complete search history.

(56) References Cited

U.S. PATENT DOCUMENTS

2011/0039152 A1* 2/2011 Kim .................... H01M 2/1022
429/178
2013/0230757 A1* 9/2013 Sakakibara ......... H01M 10/613
429/99

(Continued)

FOREIGN PATENT DOCUMENTS

CN 206116475 U * 4/2017
JP 2001-155702 6/2001

(Continued)

OTHER PUBLICATIONS

Machine translation of CN206116475 (no date).*

(Continued)

*Primary Examiner* — Amanda C. Walke
(74) *Attorney, Agent, or Firm* — K&L Gates LLP (57) ABSTRACT A battery pack is provided. The battery pack includes an exterior case and an article of an electric system including a battery. The article is configured to be accommodated in the exterior case. The article of the electric system is coated with a thin film coating agent. The article of the electric system includes the battery, a circuit board, and an electrode tab configured to electrically connect the battery or connect between the battery and the circuit board.

15 Claims, 8 Drawing Sheets (51) Int. Cl.
  *H01M 10/613* (2014.01)
  *H01M 10/6235* (2014.01)
  *H01M 10/625* (2014.01)
  *H01M 10/653* (2014.01)
  *H01M 10/6551* (2014.01)
  *H01M 10/6554* (2014.01)
  *H01M 10/643* (2014.01)
  *H01M 10/627* (2014.01)

(52) U.S. Cl.
  CPC ..... *H01M 10/627* (2015.04); *H01M 10/6235* (2015.04); *H01M 10/643* (2015.04); *H01M 10/653* (2015.04); *H01M 10/6551* (2015.04); *H01M 10/6554* (2015.04); *H01M 2220/20* (2013.01)

(56) References Cited

U.S. PATENT DOCUMENTS

| | | | |
|---|---|---|---|
| 2013/0337292 A1 | 12/2013 | Peterson et al. | |
| 2014/0017521 A1 | 1/2014 | Suzuki | |
| 2015/0075923 A1* | 3/2015 | Jang | F16D 65/18 188/162 |
| 2015/0303424 A1 | 10/2015 | Kubota | |
| 2015/0311570 A1 | 10/2015 | Adachi et al. | |
| 2017/0301965 A1* | 10/2017 | Kato | H01M 10/658 |
| 2018/0301773 A1* | 10/2018 | Sugiyama | H01M 10/643 |
| 2020/0335732 A1* | 10/2020 | Hyun | H01M 2/0285 |

FOREIGN PATENT DOCUMENTS

| | | |
|---|---|---|
| JP | 2002-134075 | 5/2002 |
| JP | 2002134075 A | 5/2002 |
| JP | 2003-288862 | 10/2003 |
| JP | 2012054121 A | 3/2012 |
| JP | 2012212599 A | 11/2012 |
| JP | 2015053276 A | 3/2015 |
| JP | 2015204263 A | 11/2015 |
| WO | 2014184993 A1 | 11/2014 |

OTHER PUBLICATIONS

European Search Report dated Mar. 25, 2020 in corresponding European Application No. 17858035.3.
International Search Report for Application No. PCT/JP2017/025208, dated Sep. 5, 2017.

* cited by examiner

BATTERY PACK, ELECTRONIC DEVICE, ELECTRICALLY DRIVEN VEHICLE, ELECTRIC TOOL, AND POWER STORAGE SYSTEM

CROSS REFERENCE TO RELATED APPLICATIONS

The present application is a continuation of PCT patent application no. PCT/JP2017/025208, filed on Jul. 11, 2017, which claims priority to Japanese patent application no. JP2016-195524 filed on Oct. 3, 2016, the entire contents of which are being incorporated herein by reference.

BACKGROUND

The present technology relates to a battery pack applicable to an electronic device, an electrically driven vehicle, an electric tool, a power storage system, and the like. More particularly the present technology relates to a battery pack having a waterproof structure and a heat dissipation structure.

In recent years, there has been an increasing demand for a battery pack in which a lithium ion battery or the like is accommodated as a power source for a hybrid device in which an engine and a motor are used as a drive source or a device in which a motor is used as a drive source. The battery pack is formed by accommodating a battery such as a lithium ion battery and one or plurality of battery blocks constructed with a battery holder holding a plurality of the batteries in an exterior case. The battery pack can be used as a power source for various electric devices, such as an electronic device, an electric assist bicycle, an electrically driven motorcycle, an electrically driven wheelchair, an electrically driven tricycle, an electrically driven cart, and an electric tool, which are used outdoors. At the same time, there is also an increasing demand for a battery pack that can be used with high power and long service life according to a usage environment of these applications.

Because a system that generates the high power is a prerequisite for the battery pack under such circumstances, it is necessary to take a measure against battery performance degradation due to heat generation from the battery. Additionally, a waterproof measure is required when an electric appliance is used in outdoor or a high-humidity environment.

SUMMARY

In the conventional technology as described above, the waterproof performance and heat dissipation performance of the battery pack are insufficient.

The present technology has been made in view of such situations, and a main object of the present technology is to provide a battery pack having the sufficient waterproof performance and heat dissipation performance.

According to an embodiment of the present technology, a battery pack is provided. The battery pack includes an exterior case; and an article of an electric system including a battery, where the article is configured to be accommodated in the exterior case. The article of the electric system is coated with a thin film coating agent.

According to an embodiment of the present technology, the article of the electric system may includes at least a battery, a circuit board, and an electrode tab configured to electrically connect the battery or connect between the battery and the circuit board.

According to an embodiment of the present technology, the coating agent may include a fluororesin coating agent. Viscosity of the coating agent may be less than or equal to 80 mP·s. A film thickness of the coating agent may range from 8 μm to 200 μm.

According to an embodiment of the present technology, an electronic device is provided. The electronic device includes the battery pack of the present technology as a power supply source. According to an embodiment of the present technology, the present technology also includes an electrically driven vehicle including: the battery pack of the present technology; a converter configured to convert electric power supplied from the battery pack into drive force; a driver configured to drive the electrically driven vehicle according to the drive force; and a controller configured to control a use state of the battery pack. According to an embodiment of the present technology, the present technology also provides an electric tool including: the battery pack of the present technology; and a movable unit to which electric power is supplied from the battery pack. According to an embodiment of the present technology, the present technology also provides a power storage system comprising: the battery pack of the present technology; an electric device to which electric power is supplied from the battery pack; and a controller configured to control power supply from the battery pack to the electric device. The electric device may include more than one electric device according to another embodiment of the present technology.

According to the present technology, the battery pack has the waterproof structure and the heat dissipation structure, so that the battery pack having waterproof performance and the heat dissipation performance can be provided. The effect described herein is not necessarily limited, and other suitable properties relating to the present technology may be realized and as further described.

DETAILED DESCRIPTION

The present technology relates to a battery pack applicable to an electronic device, an electrically driven vehicle, an electric tool, a power storage system, and the like.

As described herein, the present disclosure will be described based on examples with reference to the drawings, but the present disclosure is not to be considered limited to the examples, and various numerical values and materials in the examples are considered by way of example.

A battery pack according to a first embodiment of the present technology will be described with reference to FIGS. 1 to 5. A battery pack 1 is roughly divided into a battery block 2 constituting a power source and an exterior case 3 in which the battery block 2 is accommodated. A thermally conductive material 4 that releases heat generated from the battery block 2 and a vibration-proof material 5 contributing to vibration proof of the battery block 2 are provided in the exterior case 3. Each configuration will be described below.

A battery block 2 is constructed with a battery 21 and a battery holder 22 holding the battery 21. In the battery pack 1 of the first embodiment, the batteries 21 are arrayed with respect to the battery holder 22 so as to form four rows of seven batteries 21, and constitute a battery group.

Figure 1:
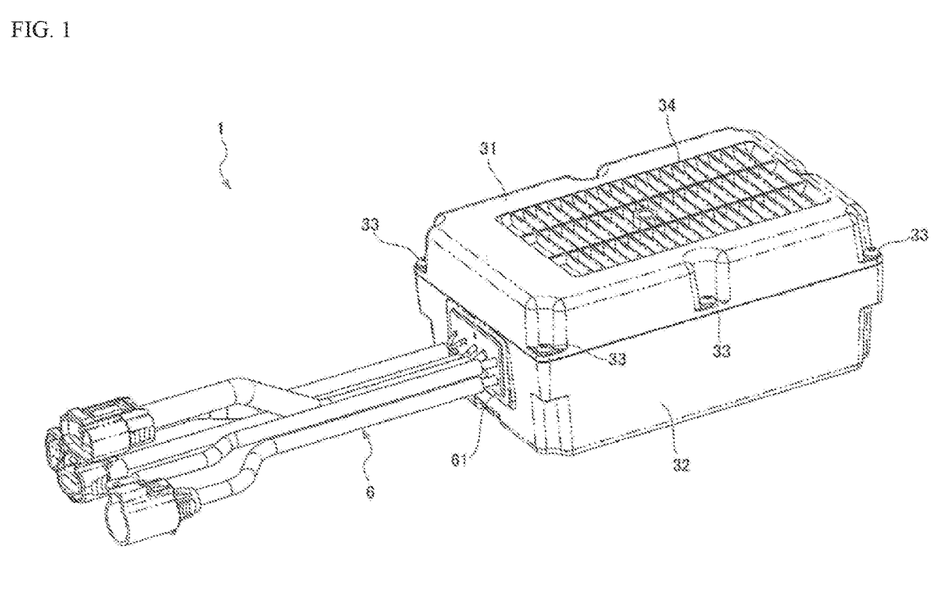
FIG. 1 is a perspective view illustrating a battery pack according to an embodiment of the present technology.
Figure 2:
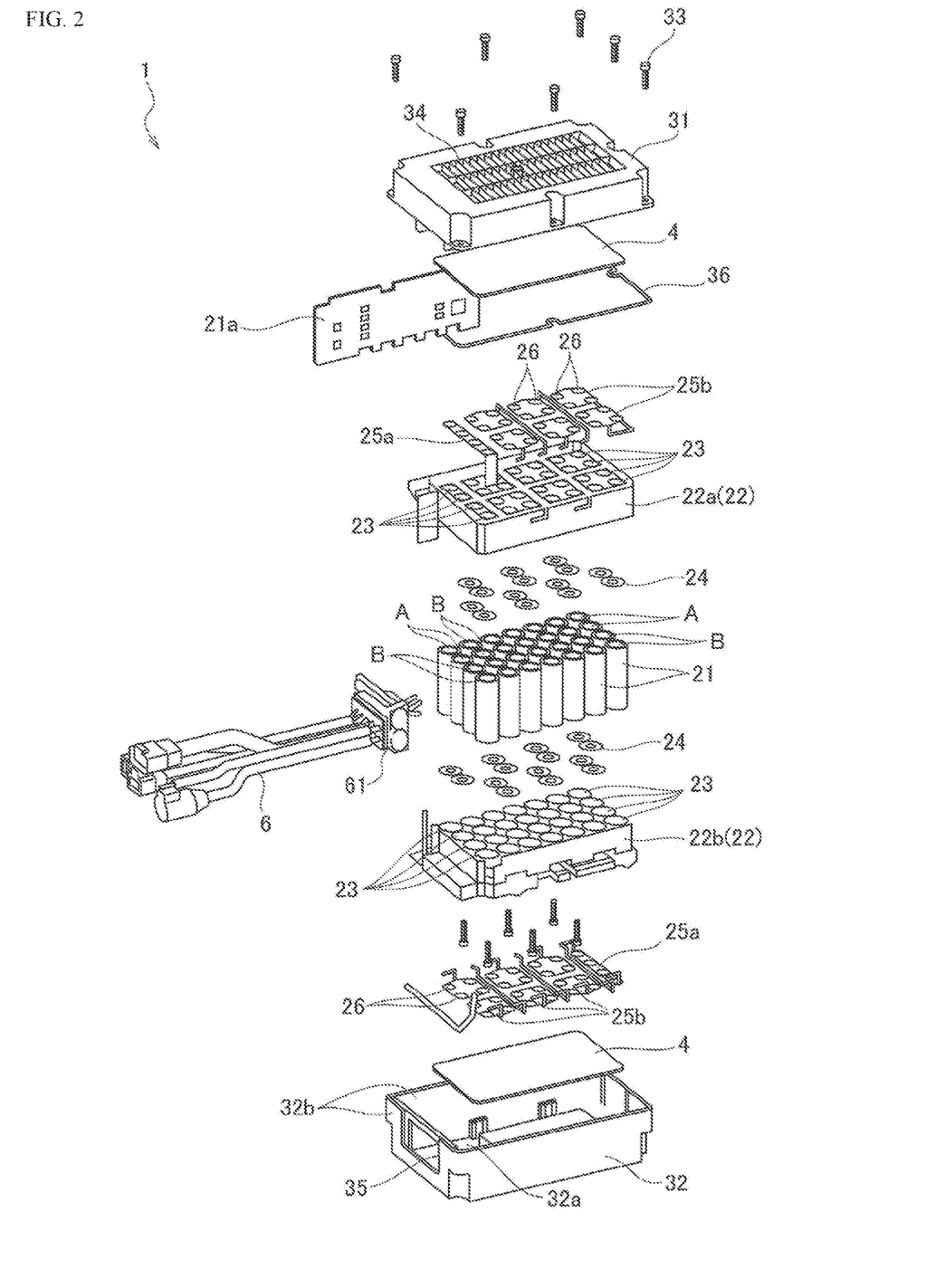
FIG. 2 is an exploded perspective view of the battery pack in FIG. 1.

Specifically, as illustrated in FIG. 2, in the battery group, the batteries 21 adjacent to each other in a longitudinal direction of the battery block 2 are arrayed such that one electrode A and the other electrode B are directed in different directions. On the other hand, with regard to a width direction of the battery block 2, in the case that two batteries 21 arrayed such that the electrodes A and B are aligned in the same direction are set as one group of batteries, two groups of batteries adjacent in the width direction of the battery block 2 are arrayed such that the electrodes A and B are oriented in different directions. In the battery pack of the present technology, the array direction of the battery in FIG. 1 is only by way of example, For example, the array direction adopted in the conventional battery block may be adopted.

The battery 21 of the present technology is not particularly limited, and a known battery can be used. Primary batteries such as a manganese dry battery, an alkaline manganese dry battery, and a lithium primary battery and secondary batteries such as a nickel-cadmium battery, a nickel-metal hydride battery, a nickel-zinc battery, a lead battery, a lithium secondary battery, a lithium ion secondary battery, and a lithium ion polymer secondary battery can be cited as an example of the battery 21. Preferably a lithium ion secondary battery (for example, model number US18650 series manufactured by Sony Corporation) is used in the battery pack of the present technology.

In the battery pack 1 of FIG. 1, the lithium ion secondary battery having high energy density is used as the battery 21. For this reason, a protection circuit 21a (PCM) is accommodated in the exterior case 3 in order to ensure safety. In the battery pack of the present technology, the configuration of the battery pack, for example, the number of the batteries 21, a connection mode, and the like can appropriately be changed according to the application of the battery pack.

In the battery pack 1 of FIG. 1, the battery holder 22 is composed of a pair of half bodies 22a, 22b, and the half bodies 22a, 22b are formed into a substantially identical shape of a substantially rectangular shape.

A material for each of the half bodies 22a, 22b is not particularly limited. For example, an insulating material such as plastic can be used. The material of each of the half bodies 22a, 22b may be a high-thermal-conductivity material containing a metal powder or carbon. Heat generated from each battery 21 can efficiently be released to the outside using the material. Alternatively, the material of each of the half bodies 22a, 22b may be a material containing glass fibers or carbon fillers. In such cases, mechanical strength of each of the half bodies 22a, 22b can be enhanced.

A battery accommodation unit 23 in which the battery 21 is accommodated is formed in each of the half bodies 22a, 22b. In the first embodiment, because twenty eight batteries 21 are held by the battery holder 22 as described above, twenty eight battery accommodation units 23 are formed in each of the half bodies 22a, 22b.

For example, each battery accommodation unit 23 has a hollow cylindrical shape, and is formed along a direction perpendicular to the longitudinal direction of the battery pack 1, and one end side is open such that one battery 21 can be inserted. On the other hand, for example, a substantially circular opening is formed on the other end side of each battery accommodation unit 23, and an electrode of each battery 21 is exposed from the battery holder 22 while each battery 21 is inserted.

In a state in which the half bodies 22a, 22b are combined, the openings of the battery accommodation units 23 of the half bodies 22a, 22b are continued to form a space in which one battery 21 is accommodated.

In each of the half bodies 22a, 22b, the battery accommodation units 23 are provided at predetermined intervals, and the batteries 21 can be insulated from each other.

Figure 3:
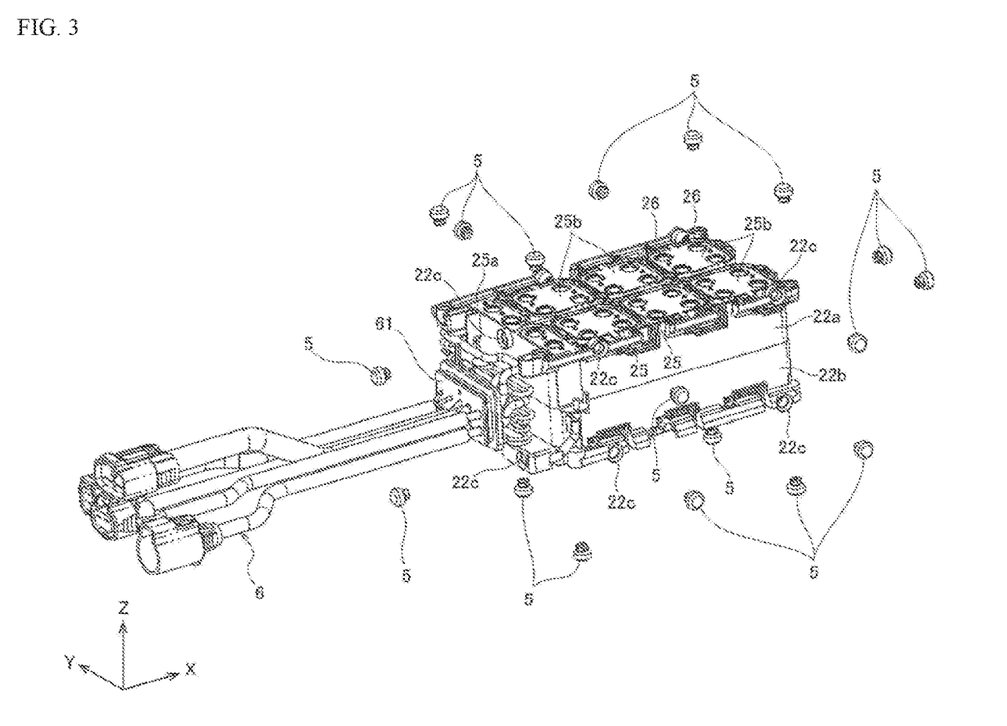
FIG. 3 is an exploded perspective view illustrating a battery block included in the battery pack in FIG. 1 and a harness.

As illustrated in FIG. 3, a plurality of insertion holes 22c in each of which the vibration-proof material 5 is combined are made in each of the half bodies 22a, 22b. As illustrated in FIG. 3, in the battery pack 1, one insertion hole 22c is made in each end face in the longitudinal direction (a direction of an arrow X) of each of the half bodies 22a, 22b, two insertion holes 22c are made in each end face in the width direction (a direction of an arrow Y) of each of the half bodies 22a, 22b, and four insertion holes 22c are made in each end face in a direction (a direction of an arrow Z) perpendicular to the longitudinal direction of each of the half bodies 22a, 22b. That is, a total of twenty insert holes 22c are made in the battery pack 1. In the battery pack 1 of the present technology, the number of the insertion holes 22c is not particularly limited, but may appropriately be changed according to the number of the vibration-proof materials 5 necessary for the vibration proof of the battery block 2.

The waterproof function of the battery pack 1 of the present technology will be described below. In the battery pack 1, the article of an electric system including the battery 21, the article being accommodated in the exterior case 3, is covered with a thin film waterproof and insulating coating agent. As used herein, "the article of the electric system"

means a low-water-resistance device through which current is passed. A rubber ring 24 is disposed as a waterproof unit between the electrode A of the battery 21 and the inner surface of the battery accommodation unit 23 facing the electrode A. A method for coating each article of the battery pack 1 is not particularly limited, and a known method can be used.

Figure 4:
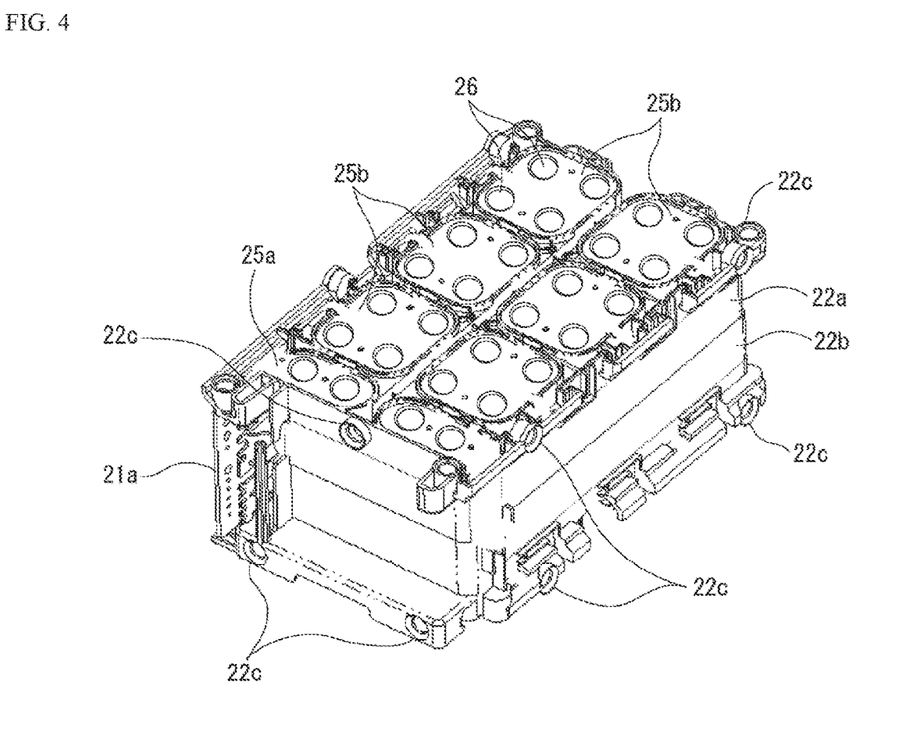
FIG. 4 is a perspective view illustrating an article coated with a coating agent in the battery pack of FIG. 1.

FIG. 4 is a perspective view illustrating the article coated with a thin film coating agent in the battery pack 1. As illustrated in FIG. 4, in the battery pack 1, the protection circuit (PCM) 21a, the battery holder half bodies 22a, 22b, the batteries 21 accommodated in the half bodies 22a, 22b, metal plates 25a, 25b as an electrode tab, and an electrode junction 26 are covered with the thin film coating agent. When coating is performed with the thin film coating agent, each article to be coated is connected and assembled, and the entire assembled articles are immersed in a coating agent and coated.

In the battery pack 1 of the present technology, the battery 21, a circuit board 21a, and the electrode tabs 25a, 25b that electrically connect between the batteries 21 or between the battery 21 and the circuit board 21a may be covered with the thin film coating agent, the battery 21, the circuit board 21a, and the electrode tabs 25a, 25b being at least the articles of the electric system. The coating performed with a coating agent of a thin film is not limited to this configuration, but any article accommodated in the exterior case 3 may be coated as long as the article includes the article of the electric system. Thus, for example, all portions except for a terminal at an end of a harness 6 may be coated with the thin film coating agent.

Preferably, a thickness of the coating agent of the present technology ranges from 8 μm to 200 μm. The minimum film thickness of 8 μm is obtained by one-time coating set at coating agent moisture permeability of 640 g/m$^2$·24H. The reason the minimum film thickness is set to 8 μm is that the film thickness of 8 μm is the minimum thickness necessary for securing the heat dissipation function and having the waterproof function. The reason the maximum film thickness is set to 200 μm is that a tolerance of the article of the battery pack 1 does not exceed ±0.2 mm.

Although viscosity of a potting material typically ranges from 1000 mPa·s to 4000 mPa·s, viscosity of the thin film coating agent is less than or equal to 80 mP·s, for example, the viscosity of the thin film coating agent is less than or equal to viscosity (60 mP·s to 80 mP·s) of salad oil. The article can be coated thinner with the potting agent having the viscosity of 80 mP·s or less when the coating is performed by dipping.

A fluororesin coating agent is used as the thin film coating agent in the battery pack 1 of the present technology. This is because the fluororesin coating agent has low viscosity, quick drying, and small influence on the environment.

However, the thin film coating agent may be a coating agent obtained by dissolving a silane- or polysilazane-based glass coating agent, a glass fiber-based coating agent, a coating agent obtained by dissolving any one of acrylic, urethane, rubber, and silicon resins into an organic solvent and a coating agent in which a film is formed by polymerization or crosslinking by any one of reactions of UV irradiation, moisture curing, and two-liquid mixing. Specific examples of the coating agent include "INT series, WOP series, OPC series" (Noda Screen Co., Ltd.), "Fluorosurf" (Fluoro Technology), "Novec™ (registered trademark)" (3M), "WP-100 series" (Daikin Industries, Ltd.), and "Dura Surf" (Harves Co., Ltd.).

A process of "forming a film by polymerizing or cross-linking by UV irradiation" will be described. A UV resin is applied to a portion in which the film should be formed by a dispenser, silk printing, or the like. The UV resin is cured by UV irradiation to form the film.

A process of "forming a film by polymerizing or cross-linking by moisture curing" will similarly be described. A moisture-effective resin is applied to a portion in which the film should be formed by a dispenser or the like. Then, the moisture-effective resin is dried by natural drying or using a dryer to form the film.

In FIG. 4, the harness 6 is not connected to the battery holder 22. However, when the thin film is coated, after the harness 6 is connected to the PCM 21a and the like in the battery holder 22 through a grommet 61, the whole may be coated together with the harness 6. The coating agent is basically colorless and transparent, but may be colored or mixed with fluorescent paint that develops color by black light.

As described above, the battery pack 1 of the present technology has the waterproof structure and the heat dissipation structure because at least the article of the electric system is coated with the thin film waterproof and insulating coating agent, so that potentials of the waterproof performance and the heat dissipation performance can be maximized. The coating agent of the present technology is the low-viscosity solvent, the whole article of the electric system can uniformly be coated without any gap. Thus, it is unnecessary to take secondary measures such as complete seal of the exterior case and covering of the cell module with vinyl when the coating is performed with a general potting agent or a molding resin.

The battery pack 1 of the present technology can be coated by any method such as dipping, spraying, brush coating, and by drying at normal temperature for a short time. Consequently, the battery 21 is not affected by the thermal influence, and a decrease in battery life can be prevented. The coating of the present technology eliminates a special facility, such as a metal mold and a jig, which maintains a shape of the coated portion until curing and is necessary during use of a thermosetting resin or a photo-curable resin.

In the battery pack 1 of the present technology, a gas release valve is covered with the thin film, and a function of releasing a gas pressure to the outside of the battery pack 1 can easily be secured. Thus, the gas generated in the battery pack 1 is released to the outside to reduce an internal pressure of the battery 21, and the fundamental safety function of avoiding cleavage explosion can be secured.

Conventionally, a hollow portion is structurally provided such that the gas release valve of the battery mechanism is not covered with a molding resin, whereby making reception during activation of the safety valve. However, the hollow portion becomes a bottleneck with respect to volume capacity density of the battery pack. On the other hand, using the thin film coating agent, the battery pack 1 of the present technology can be designed without the hollow portion. This enables efficient volume capacity density and smaller product to be achieved.

In the battery pack 1, a rubber ring 24 as a waterproof portion is disposed between the electrode A of each battery 21 and the inner surface of each battery housing portion 23 facing the electrode. For example, the rubber ring 24 is formed into a disc shape in which a substantially circular hole is made. A circumferential diameter of the rubber ring 24 is set substantially identical to or smaller than a circumferential diameter of the battery 21, and the rubber ring 24 is disposed so as to cover the electrode A. On the other hand, because the hole is made in each rubber ring 24, the electrode each battery 21 is exposed to the outside of the battery holder 22 through the hole of the rubber ring 24 while the battery 21 is inserted into the battery accommodation unit 23.

The rubber ring 24 may have elasticity, and be deformed according to an external pressure. Examples of the material for the rubber ring 24 include natural rubber, synthetic natural rubber, silicon, isoprene rubber, butadiene rubber, styrene rubber, styrene butadiene rubber, butyl rubber, ethylene propylene rubber, nitrile rubber, chlorosulfonated polyethylene rubber, acrylic rubber, urethane rubber, silicone rubber, fluorine rubber, and polysulfide rubber.

The rubber ring 24 can further enhance the waterproof effect when the rubber material contains an inorganic filler. Examples of such inorganic fillers include silica, alumina, calcium carbonate, titanium oxide, mica, zeolite, and activated carbon. In the case that a thermally conductive resin such as an epoxy resin, a phenol resin and a silicon resin is used as the material for the rubber ring 24, heat generated from the battery 21 can more efficiently be released to the outside in combination with the thermally conductive material 4.

In the battery pack of the present technology, the rubber ring 24 is provided as the waterproof portion between the electrode A of each battery 21 and each of the half bodies 22a, 22b. However, the rubber ring 24 may be provided between at least one of the electrodes of each battery 21 and at least one of the half bodies 22a, 22b. For example, each rubber ring 24 may be provided between the electrode B of each battery 21 and each of the half bodies 22a, 22b. Alternatively, the rubber ring 24 may be provided between both the electrodes A, B of each battery 21 and each of the half bodies 22a, 22b. In order to certainly prevent water from entering the battery holder 22, the rubber ring 24 may be provided between both the electrodes A, B of each battery 21 and each of the half bodies 22a, 22b.

The metal plate 25 as the electrode tab that electrically connects the batteries 21 is combined with the battery holder 22, and disposed so as to cover both electrodes A, B provided in each battery 21. The electrode junction 26 is formed in the metal plate 25, and the electrode of each battery 21 exposed from the hole of the rubber ring 24 to the outside of the battery holder 22 is in close contact with the electrode junction 26.

The material for each metal plate 25 is not particularly limited. For example, a copper alloy, nickel, and a nickel alloy can be cited. In the case that the copper alloy is used as the material for the metal plate 25, power can be distributed with low resistance. In the case that nickel or the nickel alloy is used, oxidation of the surface of the metal plate 25 can be prevented as much as possible, and weldability with the electrode of the battery 21 can also be improved.

As illustrated in FIG. 2, the battery pack 1 includes a first metal plate 25a and a second metal plate 25b, and two electrode junctions 26 are formed in the first metal plate 25a, and electrically connects the batteries 21 with two batteries 21 as a set. On the other hand, four electrode junctions 26 are formed in the second metal plate 25b, and electrically connected the batteries 21 with four batteries 21 as a set.

As illustrated in FIG. 2, two first metal plates 25a are combined with the half body 22a to electrically connect batteries 21 with two batteries 21 adjacent to each other in the width direction of the half body 22a as one set among the four batteries 21 adjacent to the harness 6 that derives electric power, and the second metal plate 25b electrically connects the other batteries 21 four by four. On the other hand, the two first metal plates 25a are also combined with the half body 22b, but each of the first metal plates 25a electrically connects two batteries 21 adjacent to each other in the width direction of the half body 22a as a set among four batteries 21 furthest away from the harness 6. On the other hand, the second metal plate 25b electrically connects the other batteries 21 four by four.

In the battery pack 1 of the present technology, the structure of each of the metal plate 25a, 25b is not particularly limited, any structure of each of the metal plate 25a, 25b can be adopted as long as the batteries 21 can be electrically connected to each other. For example, a single metal plate 25 having twenty eight electrode junctions 26 may be constructed without distinguishing the first metal plate 25a and the second metal plate 25b from each other, and all the twenty eight batteries 21 may electrically be connected to one another by the single metal plate 25.

Figure 8:
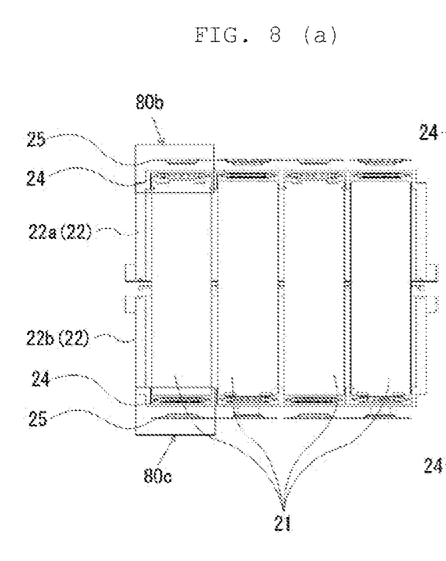
FIG. 8(a) is a partially sectional view illustrating a battery holder included in the battery pack of FIG. 1.
FIG. 8(b) is a partially enlarged view illustrating an inner wall of the battery holder in FIG. 8(a) and a positive electrode of the battery.
FIG. 8(c) is a partially enlarged view illustrating the inner wall of the battery holder in FIG. 8(a) and a negative electrode of the battery.
Figure 9:
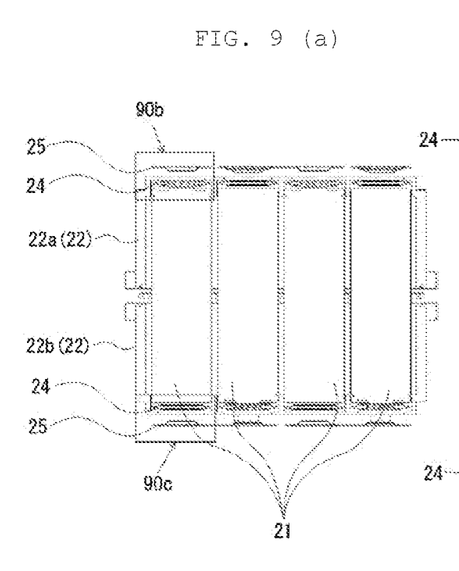
FIG. 9(a) is a partially sectional view illustrating a battery holder included in the battery pack of FIG. 1.
FIG. 9(b) is a partially enlarged view illustrating an inner wall of the battery holder in FIG. 9(a) and a positive electrode of the battery.
FIG. 9(c) is a partially enlarged view illustrating the inner wall of the battery holder in FIG. 9(a) and a negative electrode of the battery.

A procedure of bringing the electrode tab 25 into contact with both electrodes of the battery 21 accommodated in the battery holder 23 with the rubber ring 24 interposed therebetween will be described below with reference to FIGS. 8 and 9. FIGS. 8(a) and 9(a) are partially sectional views illustrating the battery holder 23 included in the battery pack 1 of FIG. 1.

In a positive electrode vicinity 90b of an upper portion of one battery 21 in FIGS. 8(a) and 8(b), the rubber ring 24 is disposed in an upper portion of the positive electrode of the battery 21 accommodated in the battery holder 23 in the half body 22a, and the electrode tab 25 is disposed above the rubber ring 24. A protrusion is formed on a lower surface (the surface contacting with the upper portion of the positive electrode) of the electrode tab 25. In a positive electrode vicinity 100b of the upper portion of one battery 21 in FIGS. 9(a) and 9(b), the rubber ring 24 is fitted into a protrusion of the positive electrode of the battery 21, and the protrusion of the electrode tab 25 is brought into contact with the protrusion of the positive electrode 21 at a central position of the ring portion of the rubber ring 24.

Similarly, in a negative electrode vicinity 90c of a lower portion of one battery 21 in FIGS. 8(a) and 8(c), the rubber ring 24 is disposed in a lower portion of the negative electrode of the battery 21 accommodated in the battery holder 23 in the half body 22b, and the electrode tab 25 is disposed below the rubber ring 24. A protrusion is formed on an upper surface (the surface contacting with the lower portion of the negative electrode) of the electrode tab 25. In a negative electrode vicinity 100c of a lower portion of one battery 21 in FIGS. 9(a) and 9(c), the rubber ring 24 is pressed against the negative electrode of the battery 21, and the protrusion of the electrode tab 25 is brought into contact with the negative electrode of the battery 21 at the central position of the ring portion of the rubber ring 24.

The battery pack 1 of the present technology includes the rubber ring 24, so that the thin film coating agent does not flow into the electrode of the battery 21 through the gas valve of the battery 21. Consequently, the battery pack 1 of the present technology can exert the potential of the waterproof performance and the heat radiation performance at the maximum. In the battery pack 1 of the present technology, the coating of a low-viscosity coating agent can uniformly and thinly be performed by a method such as dipping using the rubber ring 24 in combination.

The thermal conductive material 4 included in the battery pack 1 of the present technology will be described below. As illustrated in FIG. 2, the thermally conductive material 4 is disposed between the battery block 2 and the exterior case 3. More specifically, the heat conductive material 4 is disposed between the metal plates 25a, 25b covering the electrodes of the battery 21 and the inner surface of the exterior case 3 facing the metal plates 25a, 25b, and two thermally conductive materials 4 are provided in the whole battery pack 1. The outer surface of each thermally conductive material 4 is in close contact with the inner surface of the exterior case 3, and the inner surface of each thermally conductive material 4 is in close contact with the metal plates 25a, 25b. That is, no air layer is provided among the exterior case 3, each thermal conductive material 4, and the metal plates 25a, 25b.

Each thermal conductive material 4 is formed into a substantially flat plate shape, and formed so as to have a size covering all the metal plates 25a, 25b combined with the battery holder 22. The thickness of each thermal conductive material 4 is set in the range of 0.1 mm to 4.0 mm, preferably in the range of 0.1 mm to 2.0 mm, and more preferably in the range of 0.1 mm to 1.0 mm. The battery pack 1 can efficiently release the heat generated from each battery 21 to the outside by setting the thickness of the thermal conductive material 4 within the above range. The battery pack 1 includes the heat conductive material 4, so that the heat generated from each battery 21 can appropriately be propagated to the exterior case 3 even if each battery 21 generates the heat due to use of the battery pack 1.

Any material may be used for each thermal conductive material 4 as long as the material can appropriately propagate the heat generated from each battery 21 to the exterior case 3. For example, preferably a composite material constructed with an inorganic filler and a thermally conductive resin is used as the material for each thermal conductive material 4. At least one kind selected from a group consisting of alumina, magnesium oxide, boron nitride, silicon oxide, silicon carbide, silicon nitride and aluminum nitride can be cited as the inorganic filler. At least one kind selected from an epoxy resin, a phenol resin, and a silicon resin can be cited as the thermally conductive resin.

The battery pack 1 of the present technology includes the vibration-proof material 5 that prevents the vibration from propagating to the battery block 2, particularly the battery 21. The vibration-proof material 5 includes a head 51 formed into a substantial piece shape and a shaft 52 extending from the head 51.

An outer diameter of the head 51 is set larger than an outer diameter of the shaft 52. On the other hand, the shaft 52 is formed into a substantially columnar shape, and inserted in the insertion hole 22c formed in each of the half bodies 22a, 22b of the battery holder 22, and the outer diameter of the shaft 52 is substantially equal to or slightly larger than the inner diameter of the insertion hole 22c. For this reason, by inserting the shaft 52 in the insertion hole 22c, the vibration-proof material 5 is positioned with respect to the half bodies 22a, 22b while the head 51 protrudes from the outer surface of the half bodies 22a, 22b.

Figure 5:
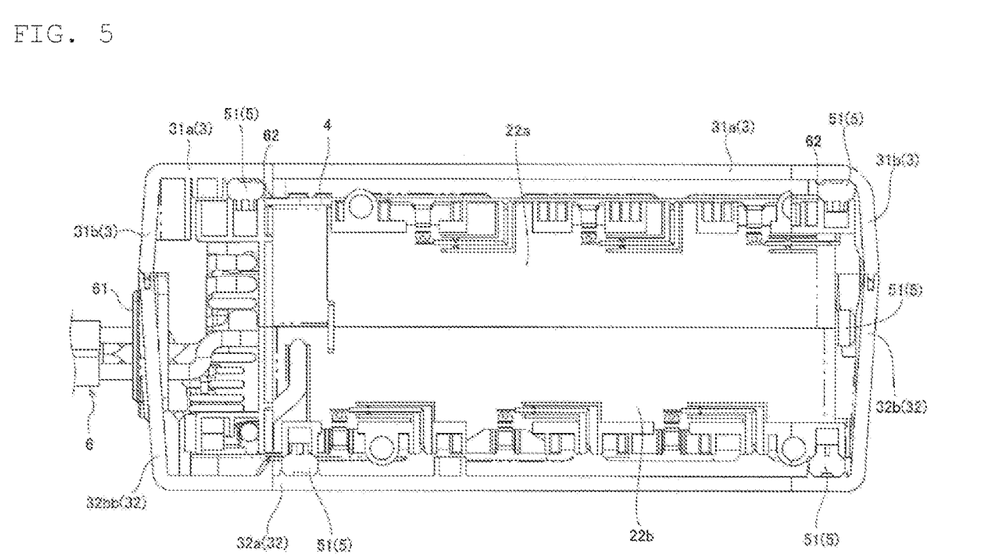
FIG. 5 is a partially sectional view of the battery pack in FIG. 1.

As illustrated in FIG. 5, a bottom surface of the head 51 is brought into close contact with the outer surfaces of the half bodies 22a, 22b while the vibration-proof material 5 is attached to each of the half bodies 22a, 22b On the other hand, the head 51 protrudes from the outer surfaces of the half bodies 22a, 22b while the vibration-proof material 5 is attached to the battery holder 22, so that the upper surface of the head 51 is pressed against the inner surface of the exterior case 3 facing each of the half bodies 22a, 22b. That is, the vibration-proof material 5 is interposed between the inner surface of the exterior case 3 and the battery holder 22.

In the vibration-proof material 5, the thickness (a length from the bottom surface contacting with the outer surface of each of the half bodies 22a, 22b to the upper surface contacting with the inner surface of the exterior case 3) of the head 51 is appropriately set by an installation weight of the vibration-proof material 5, the number of weight designating points, and an area range (hereinafter, referred to as a "target vibration-proof area range") enabling the vibration proof of the battery block 2 by the vibration-proof material 5. The thickness of the head 51 is set, for example, in the range of 3.0 mm to 10.0 mm, preferably in the range of 4.0 mm to 7.0 mm, more preferably in the range of 5.0 mm to 6.0 mm. That is, the thickness of the head 51 of the vibration-proof material 5 is set larger than the thickness of the thermally conductive material 4.

Any vibration-proof material 5 may be used as long as the material can be deformed according to the pressure from the outside, and preferably a vibration-proof rubber having an excellent vibration-proof property is used as the vibration-proof material 5. Examples of the vibration-proof rubber include diene rubbers such as natural rubber (NR), epoxidized natural rubber (ENR), polyisoprene rubber (IR), polybutadiene rubber (BR), styrene-butadiene rubber (SBR), styrene-isoprene rubber, butadiene-isoprene rubber, styrene-butadiene-isoprene rubber, chloroprene rubber (CR), acrylonitrile butadiene rubber (NBR), and ethylene propylene diene rubber (EPDM). A single diene rubber can be used, or at least two kinds of diene rubbers can be used by blending. Among others, preferably ethylene propylene diene rubber (EPDM) having the excellent vibration-proof property is used as the vibration-proof material of the present technology.

Depending on the usage environment of the battery pack 1, the vibration can be applied to the battery block 2 in all the directions such as the longitudinal direction (an X-direction in FIG. 3), the width direction (a Y-direction in FIG. 3), and the direction perpendicular to the longitudinal direction (a Z-direction in FIG. 3) of the battery pack 1. For this reason, in the battery pack 1 of FIG. 1, the vibration-proof material 5 is attached to the battery holder 22 from the longitudinal direction of the battery pack 1, the width direction, and the direction perpendicular to the longitudinal direction.

Specifically, the two vibration-proof materials 5 are inserted from the longitudinal direction in the two insertion holes 22c made in each end face in the longitudinal direction of the battery holder 22. Four vibration-proof materials 5 are inserted from the width direction in four insertion holes 22c made in each end face in the width direction of the battery holder 22. Because FIG. 2 is the perspective view, the insertion hole 22c made in the end face in the width direction on a depth side of a paper surface and a part of the vibration-proof material 5 are omitted. The four vibration-proof members 5 are inserted from the direction perpendicular to the longitudinal direction in the four insertion holes 22c made on the end face in the direction perpendicular to the longitudinal direction of the battery holder 22.

In the battery pack 1 of the present technology, a total of twenty vibration-proof materials 5 are mounted on the battery block 2. However, the number of vibration-proof materials 5 is not particularly limited, but it is only necessary for the vibration-proof material 5 to prevent the vibration from propagating to the battery block 2. The shape of the vibration-proof material 5 is not particularly limited, but may appropriately be changed according to a load applied to the battery pack 1, a vibration amount, and the size of the space where the vibration-proof material is disposed due to the size of the battery pack. The target vibration-proof region range can be adjusted from the installation weight of the vibration-proof material 5, the number of weight supporting points, and the like.

The battery pack 1 of the present technology is coated with the thin film waterproof coating agent, whereby the waterproof performance and the heat dissipation performance can be improved while the vibration-proof property is secured even in the case of the structure including the vibration-proof material 5.

Specifically, for example, when the article in FIG. 4 is coated with a high-viscosity potting agent, the coating layer becomes thick, and the vibration-proof material 5 is completely covered with the coating layer to eliminate an advantage of the floating structure in which the vibration-proof material 5 is used. For this reason, when the thin film coating is performed with the low-viscosity potting agent of the present technology, the waterproof performance and the heat dissipation performance can be secured while the advantage of the floating structure in which the vibration-proof material 5 is used is maintained.

The exterior case 3 included in the battery pack of the present technology will be described below. In the battery pack 1 of FIG. 1, the exterior case 3 is constructed with a pair of exterior half bodies 31, 32, and the exterior half body 31 and the exterior half body 32 are combined so as to be opposed to each other. In the battery pack 1 of FIG. 1, the pair of outer half bodies 31, 32 are combined by fastening the screws 33. The method for combining the pair of outer half bodies 31, 32 is not particularly limited, but a known method can be adopted.

The exterior half body 31 includes a substrate 31a facing the metal plate 25a combined with the battery holder 22 and four side surface plates 31b provided perpendicular to the substrate 31a.

Figure 7:
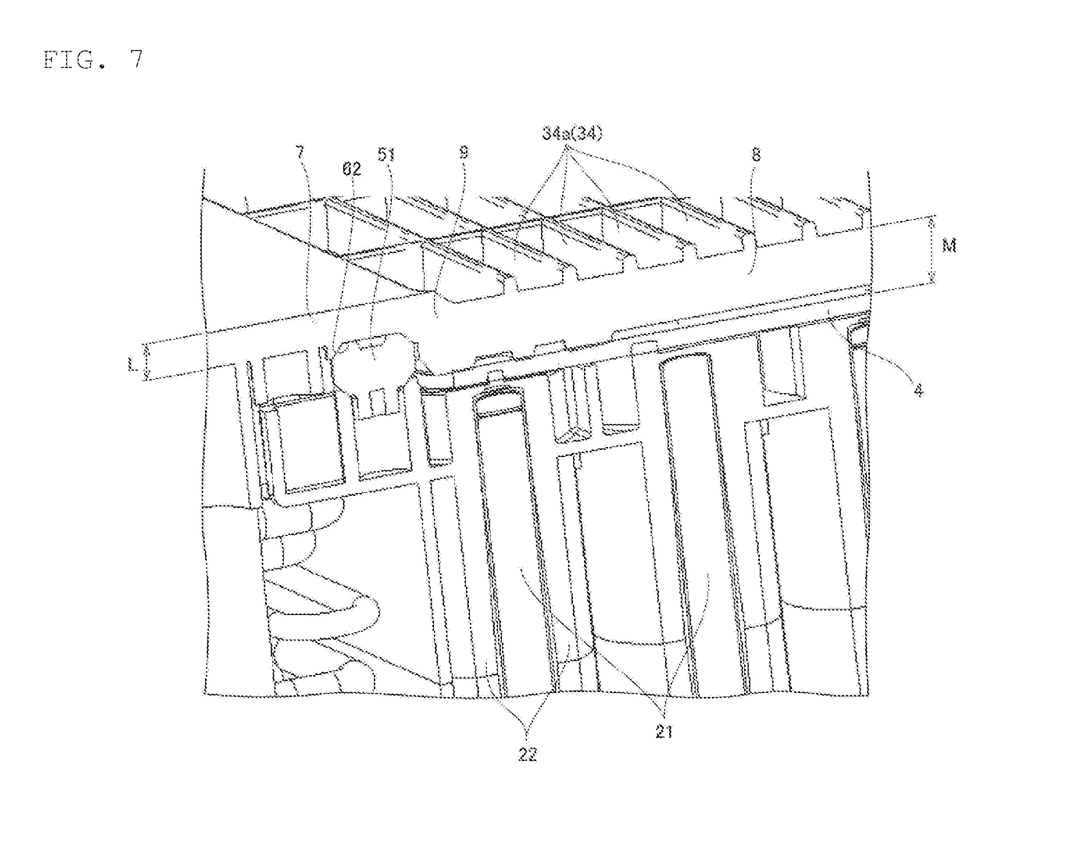
FIG. 7 is a partially enlarged perspective view illustrating the step included in the battery pack of FIG. 1.

As illustrated in FIG. 7, the substrate 31a is formed in a substantially flat plate shape, and includes a pair of flat plate-shaped first walls 7 and a second wall 8. The pair of first walls 7 contacts closely with the head 51 of the vibration-proof material 5 and has a predetermined thickness. The second wall 8 contacts closely with the thermally conductive material 4, is formed into a flat plate shape having a predetermined thickness, and is disposed between the pair of first walls 7 in the longitudinal direction of the exterior case 3.

A thickness L (the length from the outermost surface of the outer half body 31 to the surface contacting with the head 51 of the vibration-proof material 5) of the first wall 7 is set in the range of 0.5 mm to 5.0 mm, preferably in the range of 1.0 mm to 4.0 mm, more preferably in the range of 2.0 mm to 3.0 mm. On the other hand, a thickness M (the length from the inner surface contacting closely with the thermal conductive material 4 to the outer surface) of the second wall 8 is set in the range of 0.6 mm to 9.0 mm, preferably in the range of 1.1 mm to 6.0 mm, more preferably in the range of 2.1 mm to 4.0 mm.

As illustrated in FIG. 7, the first wall 7 and the second wall 8 are coupled together with a step 9 interposed therebetween, and the first wall 7 is displaced with respect to the second wall 8 in the thickness direction of the substrate 31a. Specifically, the second wall 8 is displaced inside the first wall 7 with respect to the thickness direction of the substrate 31a. That is, the second wall 8 forms a recess with respect to a plane including the outermost surfaces of the pair of first walls 7, and the outer surface and the inner surface of the step 9 have a gradient from the outer surface to the inner surface of the exterior half body 31, and the thickness of the step 9 gradually decreases from the first wall 7 toward the second wall 8.

For this reason, an accommodation space 62 partitioned by the first wall 7, the step 9, and the battery holder 22 is formed while the outer half body 31 and the battery block 2 are combined so as to opposed to each other. The head 51 of the vibration-proof material 5 is interposed in the accommodation space 62. At this point, the upper surface of the head 51 of the vibration-proof material 5 is in close contact with the first wall 7, and the side surface is in close contact with the inner surface of the step 9.

Figure 6:
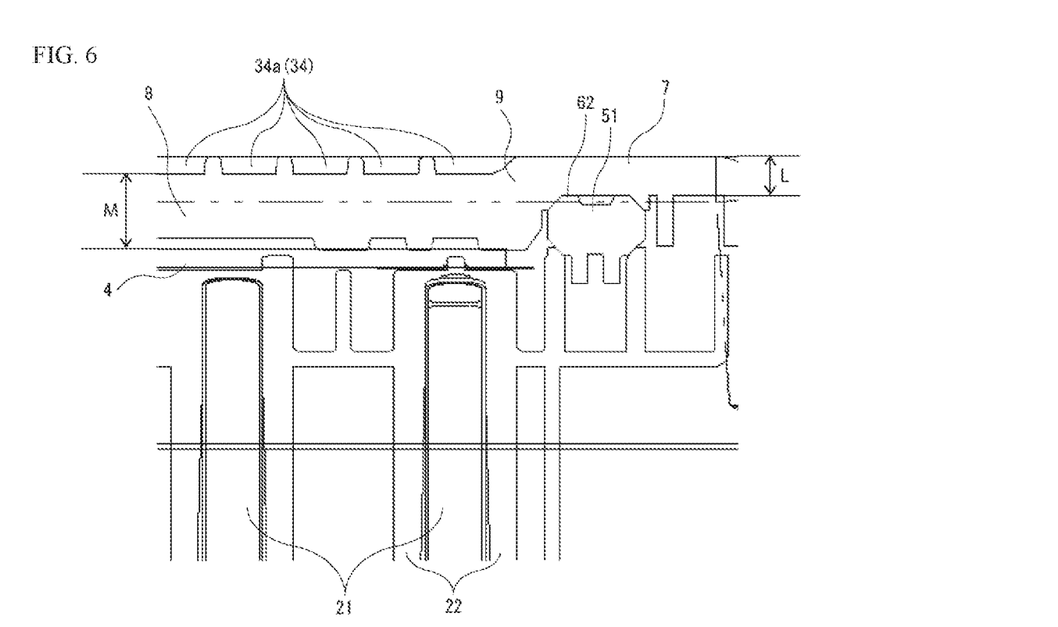
FIG. 6 is a partially enlarged view illustrating a step included in the battery pack of FIG. 1.

As illustrated in FIGS. 6 and 7, a heat dissipation unit 34 is formed in the outer surface of the second wall 8 in order to release the heat generated from the battery 21. The heat dissipation unit 34 has a configuration in which fins 34a formed into a protrusion shape are arranged at predetermined intervals along the longitudinal direction and the width direction of the battery pack 1, and has what is called a radiating fin structure. Each of the fins 34a protrudes vertically from the outer surface of the second wall 8, and a leading end surface of each fin 34a is disposed in the same plane as the outermost surface of the first wall 7, and do not protrude from the outer surface of the first wall 7.

At this point, because the thermally conductive material 4 is in close contact with the inner surface of the second wall 8, the thermally conductive material 4 and the heat dissipation unit 34 overlap each other in the direction perpendicular to the longitudinal direction of the battery pack 1 in the battery pack 1 of the present technology.

The configuration of the heat dissipation unit 34 is not limited to the heat radiating fins, but any known structure may be adopted as long as the heat generated from the battery 21 can be released to the outside of the battery pack 1. Examples of the configuration of the heat dissipation unit 34 include a structure including a rotating blade and a structure in which a metal material having excellent thermal conductivity is embedded in the substrate 31a by insert molding. The battery pack of the present technology does not necessarily include the heat dissipation unit 34.

The exterior half body 32 constituting the exterior case 3 will be described below. Although the exterior half body 32 does not have the configuration of the heat dissipation unit 34 unlike the exterior half body 31, the exterior half body 32 includes a substrate 32a facing the metal plates 25a, 25b combined with the battery holder 22 and four side surface plates 32b provided perpendicular to the substrate 32a.

Similarly to the exterior half body 31, the substrate 32a is formed into a substantially flat plate shape, and includes the first wall 7 contacting closely with the head 51 of the vibration-proof material 5 and the second wall 8 contacting closely with the thermally conductive material 4, and the first wall 7 and the second wall 8 are coupled together with the step 9 interposed therebetween. In the exterior half body 32, the configurations of the substrate 32a, the side surface plate 32b except for the side surface plate 32b disposed at one end in the longitudinal direction among the side surface plates 32b, the first wall 7, the second wall 8, and the step 9 are identical to those of the substrate 31a, the side surface plate 31b except for the side surface plate 31b disposed at one end in the longitudinal direction among the side surface plates 31b, the first wall 7, the second wall 8, and the step 9 of the exterior half body 31, thus the description thereof is omitted.

On the other hand, a lead-out hole 35 is made in a side surface plate (for convenience, denoted by a reference numeral "32bb" in the drawings) disposed at one end in the longitudinal direction among the side surface plates 32*b* of the exterior half body 32 (see FIG. 2). The grommet 61 is attached to the lead-out hole 35. The harness 6 is inserted through the grommet 61. The harness 6 is inserted in the inside of the exterior half 32 through the grommet 61, and the leading end of the harness 6 is connected to the metal plates 25*a*, 25*b*.

The exterior half body 31 and the exterior half body 32, which are configured as described above, are combined as to be opposed to each other, and an O-ring 36 is interposed between junction end faces mutually opposed to each other. The O-ring 36 prevents water from entering the exterior case 3. That is, the O-ring 36 corresponds to the second waterproof unit of the battery pack of the present technology.

The battery pack 1 of the present technology configured as described above includes the stepped 9, so that a volume of the gap between the metal plates 25*a*, 25*b* and the second wall 8 can be reduced as small as possible while the accommodation space 62 in which the head 51 of the vibration-proof material 5 can be accommodated is constructed. As a result, both the vibration-proof structure by the vibration-proof material 5 and the heat dissipation structure by the thermally conductive material 4 can be achieved. For this reason, the performance degradation of each battery 21 due to the heat generation of each battery 21 and the vibration propagated to the battery block 2 can be prevented.

Each vibration-proof material 5 is positioned and fixed to the battery holder 22, and the head 51 of each vibration-proof material 5 is in close contact with the inner surface of the first wall 7 and the inner surface of the step 9. Consequently, even if the battery pack 1 is applied to a vehicle equipped with an electric motor as a drive source and is in the usage environment in which the vibration of the drive source propagates to the battery pack 1, although the vibration is propagated to the exterior case 3, the vibration-proof material 5, particularly the head portion 51 functions as a cushioning material to be able to prevent the vibration from propagating to the battery block 2, eventually to the battery 21. The thickness of the thermally conductive material 4 disposed between the metal plates 25*a*, 25*b* and the second wall 8 can be decreased as much as possible, thereby efficiently releasing the heat generated from each battery 21 to the outside.

In the battery pack 1 of the present technology, the heat dissipation unit 34 is provided in the outer surface of the second wall 8, and provided so as to overlap the thermally conductive material 4 in the direction perpendicular to the longitudinal direction of the battery pack 1. No air layer is provided among the second wall 8 of the exterior case 3, the thermally conductive material 4, the metal plates 25*a*, 25*b*, and the electrodes of each battery 21. For this reason, the heat generated from each battery 21 is efficiently propagated in the order of the metal plates 25*a*, 25*b*, the thermally conductive material 4, the second wall 8, and the heat dissipation unit 34, and released to the outside.

The battery pack 1 of the present technology includes the step 9 to displace the second wall 8 to the inside with respect to the first wall 7, so that the heat dissipation unit 34 that does not protrude from the outermost surface of the exterior case 3 can be provided. As a result, complication of the space shape in which the battery pack 1 is accommodated can be eliminated.

In the battery pack 1 of the present technology, the O-ring 36 is provided between the outer half body 31 and the outer half body 32, so that the exterior case 3 can be hermetically sealed. For this reason, the waterproof structure can be secured together with the high heat dissipation function of the heat dissipation structure. The battery pack 1 includes the rubber ring 24 as the waterproof unit, so that the water can be prevented from entering between the battery holder 22 and each battery 21 even if the inside of the exterior case 3 is immerged.

For this reason, the performance degradation of the battery 21 caused by immersion can be prevented.

As an example, for the battery pack thickly buried with the high-viscosity resin, the heat dissipation performance is degraded when the coating layer is thick. In this case, it is necessary to increase the space filled with a protector.

In the case that the potting agent or the coating agent is used for the battery pack in which the battery including the gas valve is used for the purpose of the waterproof or the heat dissipation, the potting or coating is partially performed such that the gas valve of the battery is not covered. Thus, in the case that waterproof treatment or the like is performed, it is necessary to take a secondary measure such as complete sealing of the main body case and covering of the cell module portion with vinyl. For this reason, in such the coating, there is a risk that the performance of the heat dissipation structure and the vibration-proof structure cannot sufficiently be exerted. An active method using cooling water or forced air cooling and a passive method for increasing the efficiency of heat radiation, heat transfer, convection are selected as heat control. For the battery pack applied to an electric device, such as an electric vehicle, in which the vibration is generated, moisture intrudes into the inside of the main body case due to the vibration, and there is a risk that the article of the electric system including the battery of the main body case is damaged.

On the other hand, the present technology can provide the battery pack having a structure in which the waterproof performance, the heat dissipation performance (temperature control), the vibration-proof performance, and durability are improved in the electric and electronic devices under the situation in which the active method cannot be used but the passive method is selected.

Figure 10:
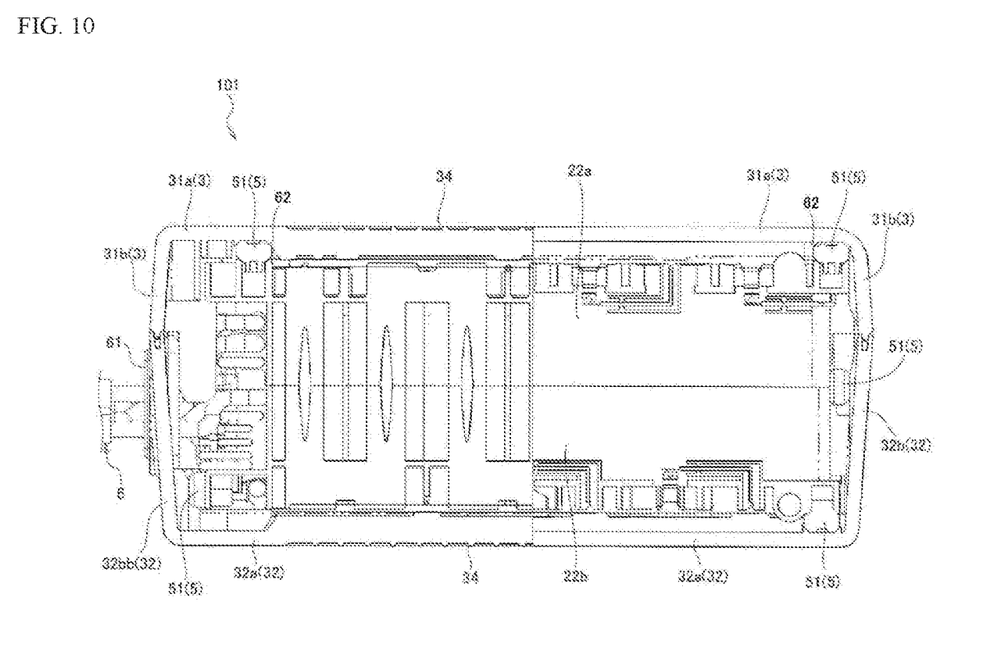
FIG. 10 is a partially sectional view illustrating a battery pack according to an embodiment of the present technology.

A battery pack according to a second embodiment of the present technology will be described below with reference to FIG. 10. A battery pack 101 of the second embodiment has the same configuration as the battery pack 1 of the first embodiment except for the configuration in which the exterior half body 32 includes the heat dissipation unit 34. For this reason, the common configuration is denoted by the same reference numeral, and the description will be omitted.

That is, in the battery pack 101 of the second embodiment, two heat dissipation units 34 are formed with respect to the exterior case 3. That is, in the battery pack 101 of FIG. 10, the heat dissipation unit 34 is also formed in the outer surface of the second wall 8 of the exterior half body 32. In the battery pack 101, the thermally conductive member 4 and the heat dissipation unit 34 are disposed so as to overlap each other in the direction perpendicular to the longitudinal direction of the battery pack 101.

Consequently, in addition to the effect of the battery pack 1 of the first embodiment, the heat generated from each battery 21 can more efficiently be released to the outside of the exterior case 3, and therefore the performance degradation of the battery 21 due to the heat generated by the battery 21 can be prevented as much as possible.

In the battery pack of the present technology, in the battery pack 1 of the first embodiment and the battery pack 101 of the second embodiment, the heat dissipation unit 34 is formed in the outer surface of the second wall 8, namely, the surface perpendicular to the longitudinal direction of the battery pack. Alternatively, for example, the heat dissipation unit 34 may be formed in at least one of the end faces in the longitudinal direction of the exterior case 3 or at least one of the end faces in the width direction of the exterior case 3. That is, the heat radiation unit 34 may be formed in one of the side surface plates 31b, 32b of each of the exterior half bodies 31, 32.

Figure 11:
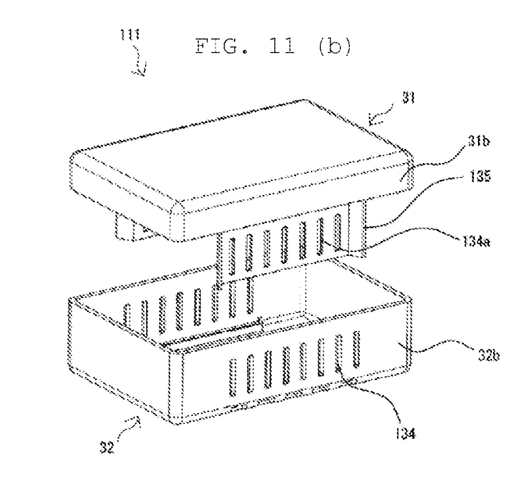
FIG. 11(a) is a view illustrating a state in which a lid of the battery pack is closed according to an embodiment of the present technology.
FIG. 11(b) is a view illustrating a state in which the lid of the battery pack is open.

A battery pack according to a third embodiment of the present technology will be described below with reference to FIGS. 11(a) and 11(b). The battery pack 111 of the third embodiment has the same configuration as the battery pack 1 of the first embodiment except for the configuration in which the exterior half body 32 includes an opening 134. For this reason, the component other than the common configuration is denoted by the same reference numeral, and the description will be omitted.

That is, in the battery pack 111 of the third embodiment, two openings 134 are formed with respect to the exterior case 3. That is, in the battery pack 111 of FIG. 11, a plurality of slit-shaped openings 134 are formed in the side surface plates 32b opposed to each other in the longitudinal direction of the exterior half body 32 of the exterior case 3. The plurality of openings 134 are arranged in the longitudinal direction of the exterior half body 32.

As illustrated in FIG. 11(b), in the battery pack 111, a connection member 135 may be provided below the side surface plates 31b opposed to each other in the longitudinal direction of the exterior half body 31 of the exterior case 3. Similarly to the side surface plate 32b, a plurality of slit-shaped openings 134a is formed in the connecting member 135. The connection member 135 is brought into contact with the inside of the side surface plate 32b of the exterior half body 32 such that opening positions of the plurality of openings 134 formed in the side surface plate 32b are matched with opening positions of the plurality of openings 134a when the battery pack 111 is formed by combining the exterior half bodies 31, 32.

The opening 134 formed in the battery pack 111 of the third embodiment acts as an air gate such that a temperature of the air layer in the vicinity of the heat generation element including the battery 21, the heat generated from the battery 21 being transmitted to the air layer in the vicinity of the heat generation element by heat conduction, convection, and heat transfer, and a temperature of outside air are circulated to establish a balance. When moisture intrudes into the exterior case 3 of the battery pack 111, the opening 134 can also be utilized as a drain hole for the moisture.

As described above, the battery pack 111 of the third embodiment includes the opening 134, whereby the heat dissipation performance can further be improved as compared with the battery pack of the first and second embodiments, and the waterproof performance and the vibration-proof performance can simultaneously be secured.

In the battery pack 111 of the third embodiment, the opening 134 is formed in the side surface plate 32b, namely, the side surface in the longitudinal direction of the battery pack. Alternatively, for example, at least one of the end surfaces in the longitudinal direction of the exterior case 3 or at least one of the end faces in the width direction of the exterior case 3. That is, the opening 134 may be formed in one of the side surface plates 31b, 32b of each of the outer half bodies 31, 32.

An example of an electronic device according to the fourth embodiment of the present technology includes the battery pack of at least one of the first through third embodiments of the present technologies as a power supply source.

The battery pack included in the electronic device of the fourth embodiment of the present technology is as described above, and is the battery pack of the first to third embodiments illustrated in FIGS. 1 to 11. Thus, the description of the battery pack will be omitted.

Examples of the electronic device of the fourth embodiment of the present technology include a notebook type personal computer, a portable information terminal (PDA), a mobile phone, a cordless phone slave machine, a video movie, a digital still camera, an electronic book, an electronic dictionary, a music player, a radio, a headphone, a game machine, a navigation system, a memory card, a pacemaker, a hearing aid, an electric tool, an electric shaver, a refrigerator, an air conditioner, a television, a stereo, a water heater, a microwave oven, a dishwasher, a washing machine, a drier, lighting equipment, a toy, a medical device, a robot, a road conditioner, and a traffic signal.

The battery packs of at least one of the first through third embodiments of the present technologies can be used to supply electric power to an electrically driven vehicle according to the fifth embodiment of the present technology. An example of the electrically driven vehicle of the fifth embodiment of the present technology includes the battery pack of at least one of the first through third embodiments of the present technologies, a converter that converts the electric power supplied from the battery pack into drive force, a driver configured to drive the electrically driven vehicle according to the drive force, and a controller that controls the use state of the battery pack. Examples of the electrically driven vehicles include a rail car, a golf cart, an electric cart, and an electric car (including a hybrid car), and the battery pack is used as a drive power supply or an auxiliary power supply.

Figure 12:
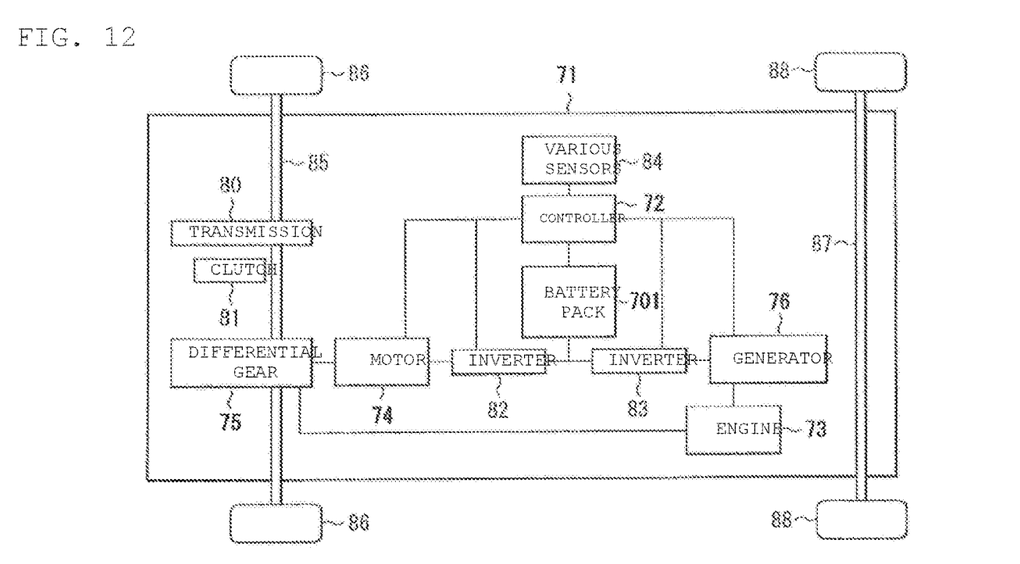
FIG. 12 is a block diagram illustrating a configuration example of an electrically driven vehicle according to an embodiment of the present technology.

FIG. 12 illustrates a block configuration of a hybrid vehicle which is an example of the electrically driven vehicle. For example, the electrically driven vehicle includes a controller 72, an engine 73, a battery pack 701, a drive motor 74, a differential gear 75, a generator 76, a transmission 80 and a clutch 81, inverters 82, 83, and various sensors 84 in a metal housing 71. For example, the electrically driven vehicle also includes a front wheel drive shaft 85, a front wheel 86, a rear wheel drive shaft 87, and a rear wheel 88, the front wheel drive shaft 85 and the rear wheel drive shaft 87 being connected to the differential gear 75 and the transmission 80.

For example, the electrically driven vehicle can run by using either the engine 73 or the motor 74 as a drive source. The engine 73 is a main power source. For example, the engine 73 is a gasoline engine. In the case that the engine 73 is used as the power source, the drive force (rotational force) of the engine 73 is transmitted to the front wheel 86 or the rear wheel 88 through the differential gear 75, the transmission 80, and the clutch 81 that are the drive unit (driver). The rotational force of the engine 73 is also transmitted to the generator 76. The generator 76 generates alternating current power using the rotational force of the generator 73, the alternating current power is converted into direct current power by the inverter 83, and the direct current power is accumulated in the battery pack 701. On the other hand, in the case that the motor 74 that is the converter is used as the power source, the electric power (DC power) supplied from the battery pack 701 is converted into the alternating current power by the inverter 82, and the motor 74 is driven using the alternating current power. For example, the drive force (rotational force) converted from the electric power by the motor 74 is transmitted to the front wheel 86 or the rear wheel 88 through the differential gear 75, the transmission 80, and the clutch 81 that are the drive unit (driver).

When the electrically driven vehicle decelerates using a braking mechanism (not illustrated), resistance force at time of deceleration is transmitted to the motor 74 as the rotational force, and the motor 74 may generate the alternating current power using the rotational force. The alternating current power is converted into the direct current power by the inverter 82, and preferably the direct current regenerated power is stored in the battery pack 701.

The controller 72 controls the operation of the whole electrically driven vehicle, and includes, for example, a CPU. The battery pack 701 may be connected to an external power supply, and store the electric power by receiving power supply from the external power supply. The various sensors 84 are used to control an engine speed of the engine 73 and to control an opening degree (throttle opening degree) of a throttle valve (not illustrated). For example, the various sensors 84 include a speed sensor, an acceleration sensor, and an engine speed sensor.

The first to third embodiments in FIGS. 1 to 11 can be applied as the battery pack 701. For this reason, the description of the battery pack will be omitted. Although the case that the electric vehicle is the hybrid vehicle is described, the electrically driven vehicle may be a vehicle (electric vehicle) that operates using only the battery pack 701 and the motor 74 with no use of the engine 73.

The battery pack of at least one of the first through third embodiments of the present technologies can also be applied to a power storage power supply for a power storage system according to a sixth embodiment of the present technology. An example of the power storage system of the sixth embodiment of the present technology includes the battery pack of at least one of the first through third embodiments of the present technologies, one or at least two electric devices to which the electric power is supplied from the battery pack, and a controller that controls the power supply from the battery pack to each of the electric device.

Figure 13:
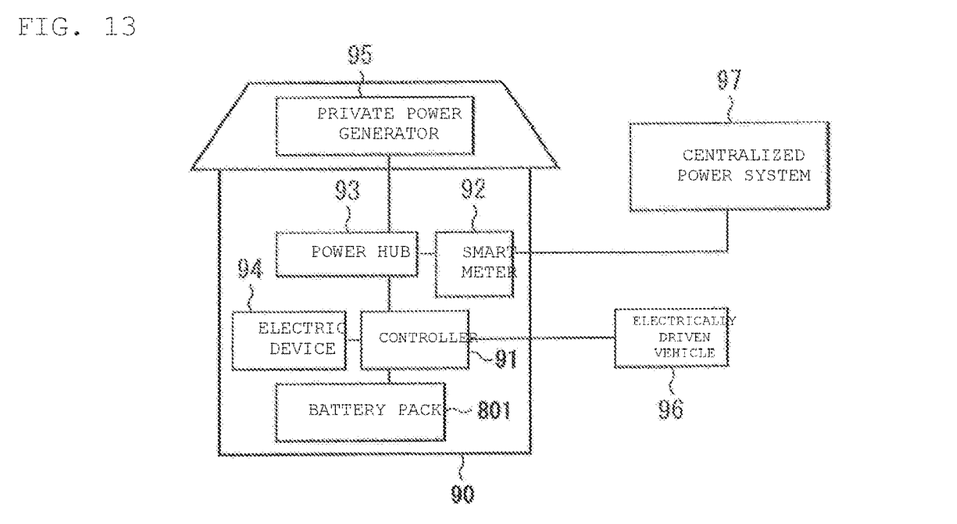
FIG. 13 is a block diagram illustrating a configuration example of a power storage system according to an embodiment of the present technology.

FIG. 13 illustrates a block configuration of the power storage system. The power storage system includes a battery pack 801, a controller 91, a smart meter 92, and a power hub 93 in a house 90 such as a general residence and a commercial building.

For example, the battery pack 801 is connected to an electric device 94 installed in the house 90, and is connectable to an electrically driven vehicle 96 stopped outside the house 90. For example, the battery pack 801 is connected to a private power generator 95 installed in the house 90 through a power hub 93, and is connectable to an external centralized power system 97 through the smart meter 92 and the power hub 93. The battery pack of the first to third embodiments in FIGS. 1 to 11 can be applied the battery pack 801. For this reason, the description of the battery pack will be omitted.

For example, an electrical appliance 94 includes one or at least two home appliances such as a refrigerator, an air conditioner, a television, and a water heater. The private power generator 95 is one or at least two kinds of solar power generator, wind power generator, and the like. The electrically driven vehicle 96 is one or at least two kinds of an electric car, an electric bike, a hybrid car, and the like. The centralized power system 97 is one or at least two kinds of a thermal power plant, a nuclear power plant, a hydraulic power plant, a wind power plant, and the like.

The controller 91 controls the operation of the whole power storage system (including the use state of the battery pack 801), and includes, for example, a CPU. For example, the smart meter 92 is a network compatible power meter installed in the house 90 of an electric power consumer, and is capable of communicating with a power supplier. Accordingly, the smart meter 92 controls the balance between demand and supply in the house 90 while communicating with the outside, which allows the supply of efficient and stable energy.

In the power storage system, for example, the electric power is stored in the battery pack 801 from the centralized power system 97 that is an external power supply through the smart meter 92 and the power hub 93, and also stored in the battery pack 801 from the photovoltaic generator 95 that is an independent power source through the power hub 93. The electric power accumulated in the battery pack 801 is supplied to the electric device 94 and the electrically driven vehicle 96 in response to an instruction of the controller 91, so that the electrically driven vehicle 96 can be charged while the electric device 94 can be operated. That is, the power storage system is a system that enables the electric power to be stored and supplied in the house 90 using the battery pack 801.

The electric power stored in the battery pack 801 can arbitrarily be used. For this reason, for example, the electric power is stored in the battery pack 801 from the centralized power system 97 at midnight when an electricity use charge is low, and the electric power stored in the battery pack 801 can be used during daytime when the electricity use charge is high.

The power storage system may be installed for each house (one household) or each of a plurality of houses (a plurality of households).

The battery packs according to at least one of the first through third embodiments of the present technologies can be applied to a power supply for a power tool according to the seventh embodiment of the present technology. An example of the electric tool of the seventh embodiment of the present technology includes the battery pack of at least one of the first through third embodiments of the present technologies and a movable unit to which the electric power is supplied from the battery pack. Examples of the electric power tool include an electric drill, an electric saw, a rolling machines such as a rammer, and an electric agricultural machine such as a lawn mowers.

Figure 14:
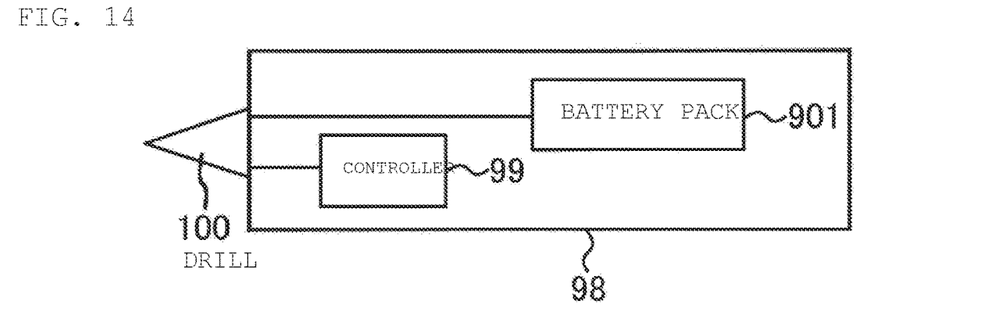
FIG. 14 is a block diagram illustrating a configuration example of an electric tool according to an embodiment of the present technology.

FIG. 14 illustrates a block configuration of the electric tool. For example, the electric tool is an electric drill, and includes a controller 99 and a battery pack 901 in a tool body 98 made of a plastic material. For example, a drill 100 that is a movable unit is operably (rotationally) attached to the tool body 98.

The controller 99 controls the operation of the whole electric tool (including the use state of the power supply 901), and includes, for example, a CPU. The controller 99 supplies the electric power from the battery pack 901 to the drill 100 in response to manipulation of an operation switch (not illustrated).

The battery packs of the first to third embodiments in FIGS. 1 to 11 can be applied to the battery pack 901. For this reason, the description of the battery pack will be omitted.

The present technology is described below in further detail according to an embodiment.

(1) A battery pack includes: an exterior case; and an article of an electric system including a battery, the article being accommodated in the external case.

The article of the electric system is coated with a thin film coating agent.

(2) In the battery pack described in (1), the article of the electric system is at least the battery, a circuit board, and an electrode tab that electrically connects between the batteries or between the battery and the circuit board.

(3) In the battery pack described in (1), the coating agent is a fluororesin coating agent.

(4) In the battery pack described in (1), viscosity of the coating agent is less than or equal to 80 mP·s.

(5) In the battery pack described in (1), a film thickness of the coating agent ranges from 8 μm to 200 μm.

(6) In the battery pack described in (1), the battery is held by a battery holder, and a rubber ring is provided between an inner wall of the battery holder and a positive electrode of the battery.

(7) In the battery pack described in (1) further includes a vibration-proof material interposed between an inner surface of the exterior case and a battery holder.
The battery is held by the battery holder.

(8) In the battery pack described in (6), the vibration-proof material is made of vibration-proof rubber.

(9) In the battery pack described in (1), an opening is provided in the exterior case.

(10) In the battery pack described in (1), the coating agent is a silane- or polysilazane-based glass coating agent.

(11) In the battery pack described in (1), the coating agent is a glass fiber-based coating agent.

(12) In the battery pack described in (1), the coating agent is a coating agent obtained by dissolving any one of acrylic, urethane, rubber and silicon resins in an organic solvent.

(13) In the battery pack described in (1), the coating agent is a coating agent in which a film is formed by polymerization or crosslinking by any one of reactions of UV irradiation, moisture curing, and two-liquid mixing.

(14) An electronic device includes the battery pack described in (1) as a power supply source.

(15) An electrically driven vehicle includes: the battery pack described in (1) a converter that converts electric power supplied from the battery pack into drive force; a drive unit that drives the electrically driven vehicle according to the drive force; and a controller that controls a use state of the battery pack.

(16) An electric tool includes: the battery pack described in (1); and a movable unit to which electric power is supplied from the battery pack.

(17) A power storage system includes: the battery pack described in (1);
one or at least two electric devices to which electric power is supplied from the battery pack; and
a controller that controls power supply from the battery pack to each of the electric devices.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:
an exterior case; and
an article of an electric system including a battery,
wherein the article is configured to be accommodated in the external case,
wherein the article of the electric system is coated with a thin film coating agent, and
wherein the coating agent includes a silane-based glass coating agent, a polysilazane-based glass coating agent or a glass fiber-based coating agent.

2. The battery pack according to claim 1, wherein the article of the electric system includes the battery, a circuit board, and an electrode tab configured to electrically connect the battery or connect between the battery and the circuit board.

3. The battery pack according to claim 1, wherein the coating agent includes a fluororesin coating agent.

4. The battery pack according to claim 1, wherein viscosity of the coating agent is less than or equal to 80 mP·s.

5. The battery pack according to claim 1, wherein a film thickness of the coating agent ranges from 8 μm to 200 μm.

6. The battery pack according to claim 1, wherein the battery is configured to be held by a battery holder, and a rubber ring is provided between an inner wall of the battery holder and a positive electrode of the battery.

7. The battery pack according to claim 6, wherein the vibration-proof material includes vibration-proof rubber.

8. The battery pack according to claim 1, further comprising a vibration-proof material interposed between an inner surface of the exterior case and the battery holder,
wherein the battery is configured to be held by a battery holder.

9. The battery pack according to claim 1, wherein an opening is provided in the exterior case.

10. The battery pack according to claim 1, wherein the coating agent is obtained by dissolving any one of acrylic, urethane, rubber and silicon resins in an organic solvent.

11. The battery pack according to claim 1, wherein the coating agent includes a film configured to be formed by polymerization or crosslinking by any one of reactions of UV irradiation, moisture curing, and two-liquid mixing.

12. An electronic device comprising the battery pack according to claim 1 as a power supply source.

13. An electrically driven vehicle comprising:
the battery pack according to claim 1;
a converter configured to convert electric power supplied from the battery pack into drive force;
a driver configured to drive the electrically driven vehicle according to the drive force; and
a controller configured to control a use state of the battery pack.

14. An electric tool comprising:
the battery pack according to claim 1; and
a movable unit to which electric power is supplied from the battery pack.

15. A power storage system comprising:
the battery pack according to claim 1;
an electric device to which electric power is supplied from the battery pack; and
a controller configured to control power supply from the battery pack to the electric device.

* * * * *